United States Patent [19]

Eaglestone

[11] 4,388,187
[45] Jun. 14, 1983

[54] FUEL FILTER

[76] Inventor: Dustin D. Eaglestone, 2350 E. Iliff, #9, Denver, Colo. 80210

[21] Appl. No.: 359,293

[22] Filed: Mar. 18, 1982

Related U.S. Application Data

[63] Continuation-in-part of Ser. No. 257,572, Apr. 27, 1981, abandoned, which is a continuation-in-part of Ser. No. 208,543, Jan. 5, 1981, abandoned.

[51] Int. Cl.³ .................... B01D 21/00; B01D 35/02
[52] U.S. Cl. .................................. 210/232; 210/306; 210/311; 210/313
[58] Field of Search ............... 210/232, 238, 299, 305, 210/306, 311, 312, 313

[56] References Cited

U.S. PATENT DOCUMENTS

| | | | |
|---|---|---|---|
| 644,262 | 2/1900 | Stair | 210/238 |
| 1,155,914 | 10/1915 | Grove | 210/312 |
| 1,574,365 | 2/1926 | Casey | 210/312 |
| 1,688,152 | 10/1928 | Pierson | 210/312 |
| 1,730,360 | 10/1929 | Fisher | 210/312 |
| 1,991,644 | 2/1935 | Wolters | 210/312 |
| 2,646,884 | 7/1953 | Findley | 210/311 |
| 2,748,948 | 6/1956 | Fricke | 210/312 |
| 3,550,776 | 12/1970 | Hamilton | 210/312 |
| 4,062,774 | 12/1977 | Hinojasa | 210/312 |

Primary Examiner—Ernest G. Therkorn
Attorney, Agent, or Firm—Gregg I. Anderson

[57] ABSTRACT

A fuel filter connectable in-line to a fuel system of an internal combustion engine has first and second separation means. The first separation means includes a reservoir in which fuel and larger contaminates settle and can be drained. The second separation means includes a baffle and screen mounted within a main body generally transverse to the fuel flow. A cap is selectively connectable to the main body to hold the screen in a set position and to further provide a passageway from the interior of the fuel filter to an outlet to the fuel system.

4 Claims, 9 Drawing Figures

FUEL FILTER

CROSS REFERENCE TO RELATED APPLICATIONS

The present application is a continuation-in-part of U.S. patent application Ser. No. 257,572, filed Apr. 27, 1981, which is a continuation-in-part of U.S. patent application Ser. No. 208,543, filed Jan. 5, 1981, both now abandoned.

BACKGROUND OF THE INVENTION

1. Field of Invention

This invention relates to fuel filters and, more particularly, to fuel filters of the type that fit in-line with an internal combustion engine fuel system.

2. Brief Description of the Prior Art

The need for improved fuel filters has drastically increased as dependence on foreign oil has increased. Oil companies and service stations have adopted the practice of storing gasoline and diesel fuel for extended periods of time in order to insure supply in times of world production shortages. This extended storage time increases the possibility of contamination of the fuel while in storage. When the fuel is finally used in a motor vehicle fuel system, particulate contaminates interfere with the flow of fuel and the efficient burning of fuel in an internal combustion engine.

Virtually all fuel filters in common use in internal combustion engines are of a disposable paper type. These disposable filters need to be replaced as often as every month for optimum efficiency, necessitating expenditure of both time and expense. Disposable fuel filters also vary widely in configuration, depending on the type of fuel system in which the filter is employed.

The conventional disposable fuel filter system does not attempt to separate larger particles from smaller particles. This reduces the efficiency of the fuel filter and fuel flow as larger particles block the filter and flow path quicker and easier than would small particles alone.

Some diesel fuel filters have utilized a fuel reservoir to collect water and suspended particles that are forced into the reservoir by centrifugal force imparted by a centriguge-like part. Though efficient, this type of filter is relatively complex and, correspondingly, expensive.

SUMMARY AND OBJECTS OF THE INVENTION

The principal object of the present invention is to provide a fuel filter that can be periodically maintained with minimum time and expense without being replaced.

A related object of the present invention is to provide a fuel filter that can be quickly and efficiently cleaned of relatively large particulate contaminates.

A further object of the present invention is to reduce substantially the amount of time involved in maintaining and/or replacing a fuel filter.

In accordance with the objects of the invention, a fuel filter is connected in-line to a fuel line of an internal combustion engine fuel system. Fuel is received in a relatively lower inlet end of the fuel filter and directed into a reservoir. In the reservoir, fuel is held under generally quiescent conditions so that larger particulate contaminates can settle out of the fuel and be selectively drained from the filter. Fuel is forced out of the reservoir by the operation of a conventional fuel pump, and through a baffle plate and superimposed screen mounted generally transverse to a vertical axis of the fuel filter. Once fuel has passed through the baffle plate and the screen, a relatively higher outlet end of the fuel filter redirects fuel back into the fuel line of the fuel system.

The unique cap threads onto a main body of the fuel filter to seat the baffle plate and screen into place with respect to the main body. The cap also has a plurality of slots placed at equal arcuate distances around the circumference of the cap so that fuel passing from the reservoir through the screen can leave the periphery of the cap and flow along a passageway defined between the main body and the cap to the outlet end of the fuel filter.

DESCRIPTION OF THE PREFERRED EMBODIMENT

Figure 1:
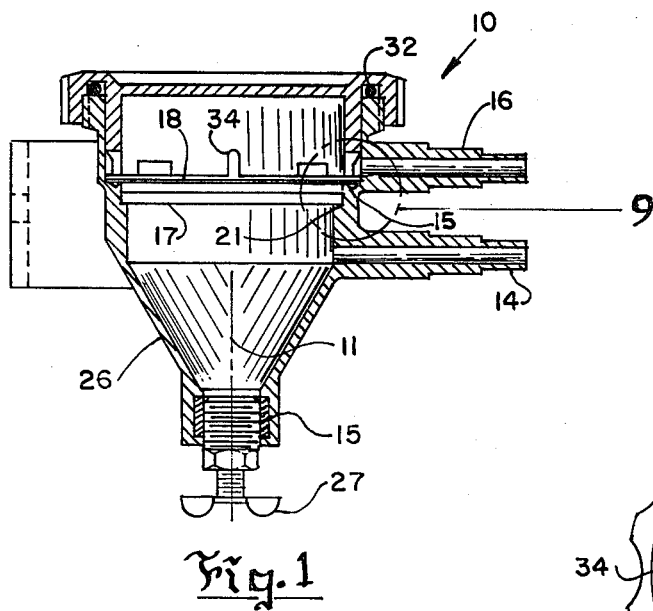
FIG. 1 is a sectional view of the fuel filter of the present invention.

A fuel filter 10 adapted to fit in a fuel line of a fuel system of an internal combustion engine is seen in FIG. 1. The fuel filter 10 is aligned along a vertical axis 11, which vertical axis is substantially perpendicular to a horizontal plane through an automobile or other motor vehicle (not shown). It is therefore seen that the vertical axis 11 is generally aligned with the force of gravity. This alignment allows larger fuel contaminates to be drained out of the filter 10 through first separation means including a drain 15 (FIG. 1).

Figure 2:
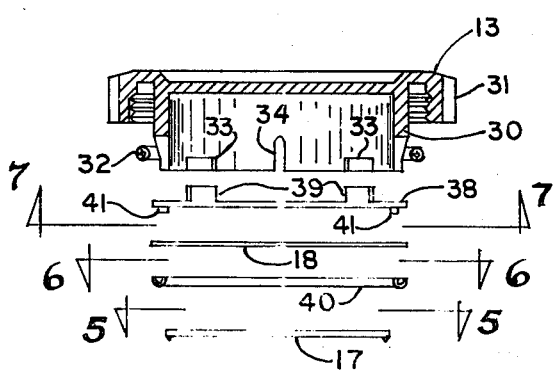
FIG. 2 is an exploded elevational view of the invention shown in FIG. 1, a cap of the invention seen in section.
Figure 2:
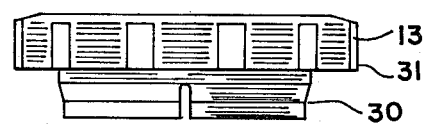
Figure 2:
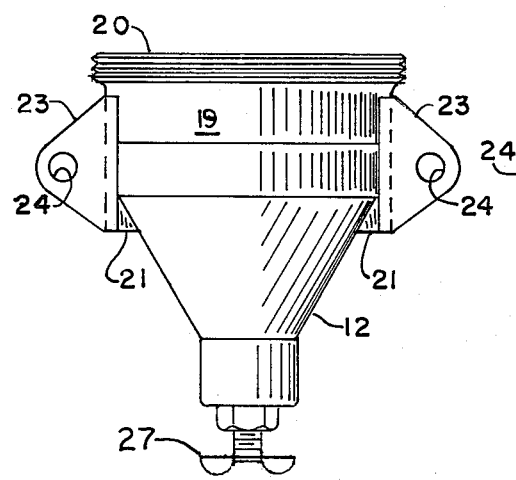

The fuel filter 10 includes two main component parts. A main body 12 (FIGS. 1, 2 and 4) receives the fuel along an integrally mounted inlet 14 and allows the fuel to flow to the engine fuel line through an outlet 16, outlet 16 being integrally mounted to the main body at a position relatively higher than the inlet 14 (FIG. 1). The inlet and outlet are generally superimposed (FIG. 1) and are aligned so as to be substantially perpendicular to the vertical axis 11. A cap 13 (FIGS. 2, 3 and 4) threadably connects to the top of the main body 12 by manual rotation about the vertical axis 11. The cap 13 acts in a manner to be discussed hereinafter to hold second separation means including a baffle plate 17 and a screen 18 in a predetermined position within the main body 12, while still providing for fuel flow from the inlet 14 to the outlet 16.

The main body 12 is preferably formed of an integral piece of hard, clear plastic. The main body is of generally circular transverse cross section at any section taken in a plane perpendicular to the vertical axis 11 along the height of the main body 12. The main body is essentially hollow and has an open mouth 20 at the upper edge thereof. The mouth 20 is externally threaded for connection to the cap 13. The mouth 20 is integrally connected to an upper, generally cylindrical, portion 19 of the main body 12, the upper cylindrical portion 19 being integral to the inlet 14 and outlet 16. The internal area of the cylindrical portion includes an upper seat or land 15 and a smaller diameter lower seat or land 21, both defining circular paths around the periphery of the cylindrical portion 19. The screen 18 will rest in a notch of the upper seat 15, while the baffle plate 17 is rigidly connected to the lower seat 21 by sonic welding. A pair of mounting brakcets 21 connect to and extend radially away from the upper portion 19 to provide connection to an engine compartment of the motor vehicle (not shown). The mounting brackets connect tangentially to the upper portion through a pair of parallel arms 22 which act to space the fuel filter 10 away from the engine compartment. A pair of ears 23 (FIG. 2) are integral to and extend perpendicularly from the arms 22. The ears have a hole 24 therein to receive connection means (not shown).

A lower portion or reservoir 26 of the main body 12 funnels downwardly and inwardly to the drain 15 from the upper portion 19, which drain includes a spigot or petcock valve 27, to selectively open and/or close the first filtration means (FIG. 1). The reservoir 26 is in the form of an inverted hollow truncated cone, shaped to direct larger contaminates to the drain, from which the petcock valve can selectively open to release the particles. The drain 15 is in the form of a short cylindrical extension to the bottom of the reservoir 26, having a threaded bore therethrough, which bore receives the petcock valve 27.

Figure 3:
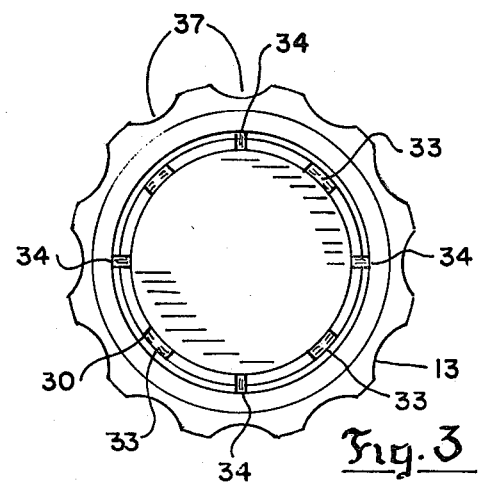
FIG. 3 is a bottom plan view of the cap of the invention shown in FIG. 1.
Figure 4:
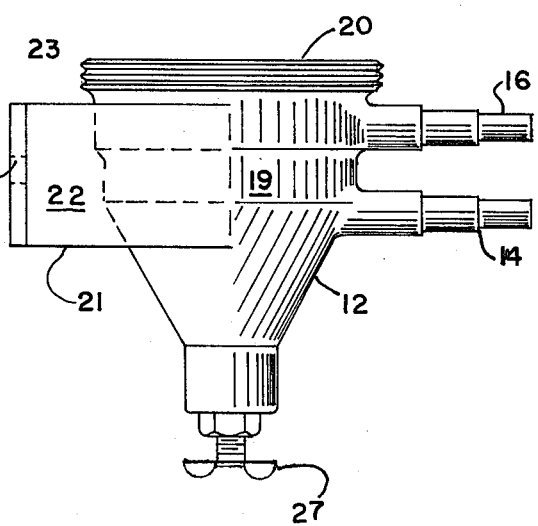
FIG. 4 is a side elevational view of a body and the cap of the invention shown in FIG. 1.

The cap 13 is of generally circular plan view, as seen in FIG. 3. The cap includes an insert portion 30 and a downwardly depending connection skirt 31. The insert 30 is of generally circular transverse cross section relative to the vertical axis 11.

The insert 30, when the cap 13 is tightly connected to the main body 12 (FIG. 1), extends downwardly into the cylindrical portion 19 of the main body 12 to contact the area of the upper seat 19 and thereby hold the screen 18 in position. An O-ring 32 is inserted in position between the insert 30 and the skirt 31 and is compressed tightly against the mouth 20 of the main body 12 (FIG. 1), upon connection of the cap to the main body.

Around the lower edge of the insert 30 are equally spaced slots 34 of a preselected height, as well as notches 33 which assist in connecting the screen 18 to the cap 13. The slots 34 provide a fluid communication path from the interior of the fuel filter 10 to a circular passageway 35, said passageway defined by the area between the insert 30 and the interior of the upper portion 19 (FIG. 9) when the cap is thoroughly tightened onto the main body. The passageway 35 allows fuel passing from the inlet 14 to the outlet 16 to flow around the outer periphery of the inner surface of the upper portion 19 to reach the outlet 16.

The skirt 31 of the cap 13 extends outwardly over the mouth 20 of the main body 12 and downwardly thereover. The skirt 31 is internally threaded so as to threadingly engage the external threads of the mouth 20. A plurality of finger pads 37 (FIG. 3) are positioned around the outer circumference of the skirt 31 to facilitate gripping of the cap.

Figure 9:
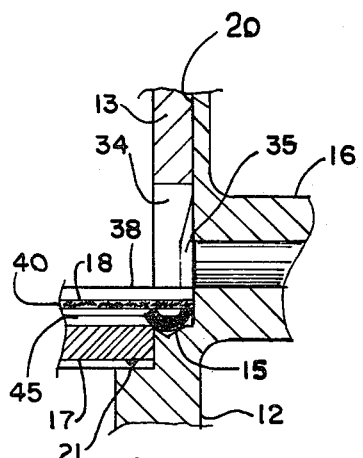
FIG. 9 is a fragmentary enlarged section view taken in the circled area 9 of FIG. 1.
Figure 8:
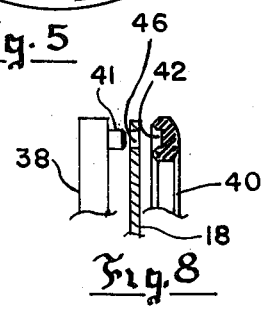
FIG. 8 is an enlarged fragmentary exploded view of the screen and ring assembly.
Figure 7:
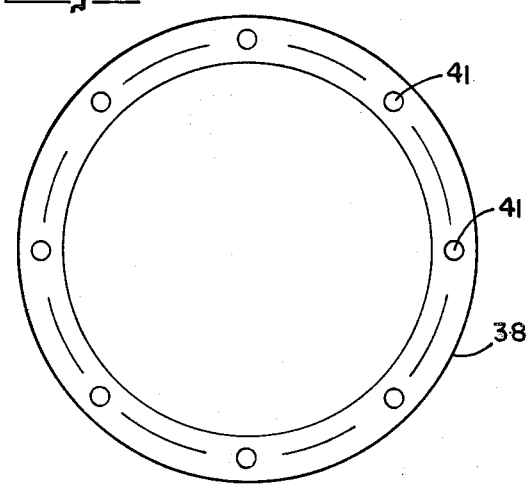
FIG. 7 is a plan view of an upper retainer ring.
Figure 6:
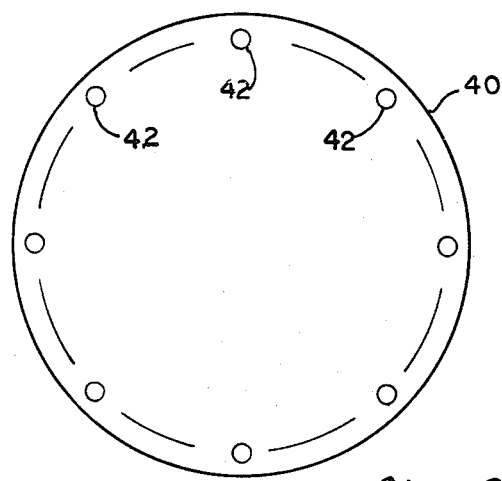
FIG. 6 is a plan view of a lower screen retainer ring.

The screen 18 is circular and is of fine mesh of the rating of one micron. The screen 18 is held between an upper retainer plate 38 and a lower retainer plate 40 (FIGS. 6, 7 and 9). The upper plate 38 includes upwardly extending tabs 39 (FIG. 2) adapted to form a snap or frictional connection with the notches 33 of the cap 13. Connection pins 41 project downwardly through the holes 46 in the screen 18 to form a second snap or frictional connection (FIG. 8) with receiving holes 42 of the lower retainer plate 40. The lower retainer plate is then seated against the upper seat 15 and held in position by the insert 30 of the cap 13, once the cap 13 is completely tightened down onto the main body 12.

Figure 5:
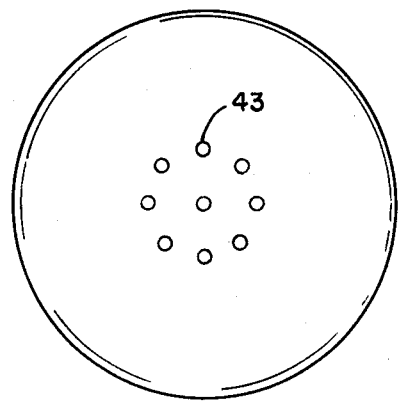
FIG. 5 is a plan view of a baffle plate of the invention shown in FIG. 1.

The baffle plate 17 (FIG. 5) is of circular plane view and is adapted to be rigidly connected to the lower seat 21 of the main body 12 (FIG. 9). A relatively small number of holes 43, nine as shown, pass therethrough and provide fluid communication across the baffle 17 between the lower inlet 14 and the upper outlet 16. There is a space 45 between the baffle 17 and the screen 18, providing better flow across the screen and by allowing fuel to disperse in the space 45 across the area of the screen.

The fuel filter 10 is assembled by rigidly connecting the baffle 17 to the lower seat 21. The screen 18, sandwiched between retainers 38 and 40, is connected by the notches 33 of the cap 13 and the tabs 39 of the upper retainer ring 38 to the cap 13. The cap is screwed down over the baffle plate 17, leaving the space 45 between the baffle and screen and seating the screen 18 and its lower retainer ring 40 on seat 15.

The fuel filter 10 cleanses fuel entering the fuel filter from particulate contaminates in essentially a two-step separation process. Initially, the fuel enters the inlet 14 where relatively heavy particulate matter will fall into the reservoir 26 for later draining by the petcock valve 27. This step is the first separation means 15. Water in the fuel is also separated.

Under the force of pressure of a fuel pump (not shown), the fuel is then drawn past the baffle plate 17. Some larger particles will again impinge the baffle plate the baffle plate and fall into the reservoir 26 before passing through any of the holes 43 in the baffle plate. The relatively few number of holes 43 increase the likelihood that these larger particles will fall into the reservoir 26, rather than being entrained in the fuel flow and passed through the holes 43 to possibly clog the screen 18. The fuel then is forced past the screen 18 and into the interior of the upper portion 19 of the main body 12, as further defined by the insert 30 of the cap 13. The fuel is drawn or pushed, by upstream fuel pressure or downstream pressure, provided by the fuel pump. The slots 34 allow fuel into the passageway 35 between the upper portion 19 and the insert 30, thereby reaching the outlet 16, as seen in FIG. 9. The screen 18 and baffle 17 therefore form the second separation means.

It will be appreciated that it is an easy matter to drain the reservoir 26 of particulate matter by merely opening the petcock valve 28. In a similar manner, the entire interior of the fuel filter 10 and the screen can be easily removed for cleaning or replacement.

Although the present invention has been described with a certain degree of particularity, it is understood the present disclosure has been made by way of example and that changes in detail and structure may be made without departing from the spirit thereof.

What is claimed is:

1. A fuel filter adapted for use in a fuel system comprising in combination:
   a main body portion having a vertical axis passing therethrough and a relatively lower inlet connected to a fuel line in said fuel system and a relatively higher outlet connected in-line to said fuel line, said main body further including a reservoir therein having first separation means for draining said reservoir, said first separation means located at a bottommost location on said main body and in general alignment with said vertical axis,
   second separation means including a baffle plate having a relatively small number of holes passing therethrough and a screen spaced a relatively small distance above said baffle plate, said baffle plate and screen mounted in said main body at a position intermediate said inlet and said outlet; and
   a cap having an insert portion insertable within the main body and a skirt depending downwardly therefrom having connection means for connecting said cap to said main body, said insert portion of said cap adapted to seat against said screen and hold said screen into position within said main body and to further provide a flow passageway for fuel to pass from the interior of said cap and main body to said outlet.

2. The invention as defined in claim 1 wherein said cap insert portion is releasably connected to a retainer holding said screen.

3. The invention defined in claim 2 wherein said retainer has tabs adapted to form a snap connection with notches formed in said insert portion.

4. The invention as defined in claim 2 or 3 wherein said first separation means of said main body includes an upper generally cylindrical portion, said reservoir is integrally connected thereto, said reservoir further being of generally hollow, truncated-cone shape, sides of said reservoir converging downwardly and inwardly to a selectively operable and closably drain.

* * * * *